United States Patent [19]

Ray

[11] Patent Number: 5,283,077
[45] Date of Patent: Feb. 1, 1994

[54] METHOD OF PREPARING SNACK FOOD PRODUCTS

[75] Inventor: Earl E. Ray, Las Cruces, N. Mex.
[73] Assignee: New Mexico State University Technology Transfer Corp., Las Cruces, N. Mex.
[21] Appl. No.: 982,159
[22] Filed: Nov. 25, 1992

Related U.S. Application Data

[63] Continuation of Ser. No. 918,893, Jul. 20, 1992, abandoned, which is a continuation of Ser. No. 761,401, Sep. 17, 1991, abandoned.
[51] Int. Cl.$^5$ .................. A23L 1/217; A23L 1/314
[52] U.S. Cl. .................. 426/637; 426/448; 426/512; 426/513; 426/516; 426/646
[58] Field of Search ............. 426/641, 646, 513, 448, 426/417, 637, 512, 516

[56] References Cited

U.S. PATENT DOCUMENTS

| | | | |
|---|---|---|---|
| 3,447,929 | 6/1969 | Hale . | |
| 3,753,729 | 8/1973 | Harms et al. . | |
| 3,849,582 | 11/1974 | Blagdon et al. . | |
| 3,908,025 | 9/1975 | Miller et al. | 426/623 |
| 3,917,876 | 11/1975 | Harwood et al. | 426/585 |
| 3,968,269 | 7/1976 | Payne et al. | 426/629 |
| 4,262,028 | 4/1981 | Meyer et al. | 426/417 |
| 4,384,009 | 5/1983 | Lewis et al. | 426/646 |
| 4,623,548 | 11/1986 | Willard | 426/559 |
| 4,743,461 | 5/1988 | Gellman et al. | 426/646 X |
| 4,868,002 | 9/1989 | Scaglione et al. | 426/513 X |
| 4,910,038 | 3/1990 | Ducharme | 426/646 X |
| 5,026,572 | 6/1991 | Neiberger | 426/646 X |

FOREIGN PATENT DOCUMENTS

| | | |
|---|---|---|
| 694276 | 9/1964 | Canada . |
| 0131701 | 5/1984 | European Pat. Off. . |
| 1310348 | 3/1973 | United Kingdom . |

OTHER PUBLICATIONS

"Development and Evaluation of Expanded Snack Foods Containing Mechanically Separated Meat (Beef)" by Earl E. Ray et al., Livestock Research Briefs and Cattle Growers' Short Course, NMSU Publication, p. 45 (Apr. 15, 1989).
"Extrusion of a Nutritious, Meat Containing Snack Food" by E. E. Ray et al., Livestock Research Briefs and Cattle Growers' Short Course, NMSU Publication, p. 45 (Mar. 21, 1991).
"Optimum Extrusion Processing Conditions to Produce an Expanded Beef-Snack" by Kimberly C. Hren et al., Livestock Research Briefs and Cattle Growers' Short Course, NMSU Publication, p. 25 (Mar. 22, 1990).
"Properties of an Extruded, Expanded Snack Food Containing Meat and Potatoes" by E. E. Ray et al., Livestock Research Briefs and Cattle Growers' Short Course, NMSU Publication, p. 55, (Mar. 26, 1992).
"Continuous Production of a Synthesized Jerky Using a High-Temperature, Short-Time (HTST) Food Extruder" by E. E. Ray et al., Livestock Research Briefs and Cattle Growers' Short Course, NMSU Publication, p. 56 (Mar. 26, 1992).
"Effects of salt and storage characteristics of an expanded snack food containing mechanically separated beef (MSB) and potato flour," by D. A. Shaw et al., *Abstract*, Amer. Cos. Anim. Sci., vol. 387, p. 341 (Aug. 6–9, 1991).
Final report for the project entitled: "Development and Evaluation of Expanded Snack Foods Containing Mechanically Separated Meat (Beef)" by Dr. Earl E. Ray, College of Agriculture and Home Economics, *Memorandum*, pp. 1–16 (Oct. 16, 1990).

*Primary Examiner*—Arthur L. Corbin
*Attorney, Agent, or Firm*—Rod D. Baker; Donovan F. Duggan

[57] ABSTRACT

A method of preparing and producing a nutritious, low calorie, low cholesterol, shelf-stable, expanded snack food product is disclosed. The process involves using a proteinaceous material, such as raw comminuted meats or mechanically separated meats, that are frozen or chilled. Prior to using the raw, frozen or chilled meat, it is further comminuted to relatively small particle size to provide optimum dispersion of the meat products with the farinaceous (starch) component of the mixture. This blend containing the raw, frozen or chilled meat products, is mixed with pregelatinized flour and is then subjected to elevated temperatures and shear pressure as it moves through the high-temperature, short-time, screw-type extruder. Flavorings, coloring, spices, and the like, may be topically applied to the extrudate prior to packaging and after cutting to desired lengths.

20 Claims, No Drawings

METHOD OF PREPARING SNACK FOOD PRODUCTS

This is a continuation of copending application Ser. No. 07/918,893 filed Jul. 20, 1992 which is a continuation of Ser. No. 07/761,401 filed Sep. 17, 1991, both now abandoned.

BACKGROUND OF THE INVENTION

1. Field of the Invention

The invention relates to a snack food composition and method of making such composition.

2. Background Art

There are numerous processes for producing snack food products for the consumer. Many of these products are deep-fat fried in order for the product to expand and result in a puffed product. Needless to say, this method of deep-fat frying has the disadvantage of absorbing large amounts of fat, resulting in a product with high caloric content which many consumers do not find acceptable.

U.S. Pat. No. 3,849,582, entitled *Fortified Snack Process and Product*, to Blagdon, et al., describes a process for producing low calorie snack food products which involves fortifying carbohydrate materials that have been substantially pregelatinized with a protein material which has not been substantially heat gelled. The protein source may be any high purity proteins, for example, milk, egg, or oilseed proteins. Blagdon, et al., also use a starch modifying and complexing agent, such as a saturated monoglyceride material, to prevent the hydration of the starch molecule by water. The shaped product is then converted to a snack food product, preferably by frying, since the heating step also serves to set or heat-gel the protein source. The moisture content of the cooked product ranges from 2–6% by weight; protein content ranges from 16–25% by weight; starch content ranges from 49–56% by weight; and the fat content ranges between 12% and 35% by weight.

U.S. Pat. No. 3,447,929, entitled *Method of Manufacturing a Meat-Containing Expanded Food Product*, to Hale, et al., describes a method of producing a meat-containing expanded food product directly from proteinaceous material, such as raw meat, that has been heated and dried to decrease its moisture to a value between 20% and 40%, and which also has been ground to reduce the particle size. The ground material is then subjected to elevated temperatures and pressure using an extruder to cook the dried meat. A farinaceous material component may be combined with the dried meat. The expanded cooked meat material is broken into pellets and further drying of the pellets is required.

U.S. Pat. No. 3,753,729, entitled *Method for Preparing Food Snack Compositions*, to Harms, et al., also proposes a process that involves adding a mixture of a starch material and fatty glyceride through a hopper into a housing containing a screw, and thereafter forcing the mixture through a small orifice that may be one of many shapes. A puffed product containing granulated starch material is produced having an abrasion rating of less than 30%; 50% of the material would pass through a sieve screen having a 0.0041 inch opening, and contains between 10% and 15% moisture. The starch materials used may be an acid-modified starch derived from corn, white milo, or dehulled and degerminated corn. No meat, either raw, dried, or frozen, is used in this method.

The process used in U.S. Pat. No. 4,262,028, entitled *Composition Containing Animal Parts for Production of a Fried Snack Food and Method for Production Thereof*, to Meyer, et al., also requires drying raw animal parts to a relatively low moisture content, comminuting those animal parts to a relatively small particle size, and mechanically defatting the animal particles to a reduced fat (less than 15–18%) content. It is also disclosed that the animal parts may comprise no more than 25% hot oil rendered parts in order to avoid problems in gelatinization of the animal parts. The animal parts may be chosen from a wide variety of high collagen content meat parts. However, the most preferable animal parts are conventional green pork skins, in part rendered pork skins, bacon or ham rinds, connective tissue, cartilage, and intestinal tract tissue. It is only necessary that the total mixture of animal parts have a relatively high average collagen content. The moisture content of the animal parts must be reduced to less than 35% by air, smoke, or the like, at a preferred drying temperature between 212° F. and 275° F., for less than five hours. After appropriate drying, the animal parts are preferably comminuted, and it is also preferred that the dried material be cooled prior to comminuting. The animal parts must be reduced in fat content by rendering or mechanical defatting in order to accomplish sufficient gelatinization in the extruder, and mechanical defatting is preferred over hot oil rendering.

U.S. Pat. No. 4,623,548, entitled *Method for Preparing Extruded Fried Snack Products from Corn and Other Cereal Flours*, to Willard, teaches an expanded, fried cereal-based snack product comprising essentially (1) a low water-absorbing component, (2) a high water-absorbing component, and (3) a starch component comprising one or more ungelatinized starches, comprising from about 10% to 45%, by weight, of the total dry solids. This invention uses only cereals, preferably corn, to make an expanded snack which needs frying and does not contain any meat in its composition.

Canadian Patent No. 694,276, entitled *Farinaceous Animal Food*, to Burgess, et al., likewise contains no meat and comprises a pet food prepared by high temperatures "substantially above 212° F."

U.S. Pat. No. 3,908,025, entitled *Pet Food Product and Method for Forming Same*, to Miller, et al., also teaches a pet food composition requiring temperatures above 212° F.

European Patent No. EP 0 131 701 to Rapp teaches an extruded potato chip composition comprising potato powder, ballast, and seasonings. No meat products are used in the product.

Thus, the prior art has failed to provide a means of combining non-rendered, undried, raw, frozen or chilled comminuted meats and other similar meat products with farinaceous material components to form an expanded snack product that is nutritious, lower in calories than conventional snacks, is highly palatable, with a long, stable shelf life and which has a lower fat content and higher protein content than normally prepared fat-fried products.

SUMMARY OF THE INVENTION

The preferred method of the invention comprises a method of preparing a snack food comprising the steps of freezing or chilling fresh proteinaceous material, blending the chilled or frozen proteinaceous material with farinaceous material, and extruding the blended proteinaceous and farinaceous materials. The preferred method of the invention further comprises the steps of mechanically preparing and freezing or chilling selected meat products. The step of mechanically preparing selected meat products may further comprise the step of deboning selected meat products, mixing lean meat and fat or providing fat-reduced beef trimmings.

The preferred method of the invention further comprises the steps of comminuting the frozen or chilled proteinaceous material by grinding and subsequently storing the frozen or chilled proteinaceous material at a temperature within the range of 0°-5° C.

The preferred method of the invention further comprises the step of gelatinizing farinaceous material and heating and compressing the blended proteinaceous and farinaceous material. The preferred method of heating the blended proteinaceous and farinaceous material comprises the steps of heating the blended proteinaceous and farinaceous material above its heat of vaporization and subsequently expanding the blended proteinaceous and farinaceous material.

The preferred method of the invention further comprises the steps of seasoning and cutting the blended proteinaceous and farinaceous material.

The preferred composition of the invention comprises a blended extrudate of frozen or chilled defatted animal parts and starch. The preferred composition of the invention further comprises a moisture content of less than 20% by weight and in the range of between 10% and 15% for optimum expansion; a fat content of less than 8% by weight with a preferred range of 3-6% for optimum expansion; a starch content of approximately 80-90% by weight prior to extrusion with a preferred range being between 85% and 88% starch content. The preferred composition of the invention further comprises raw defatted beef parts, and comminuted animal parts. The preferred composition of the invention further comprises potato flour and pregelatinized potato flour.

The preferred composition of the invention further comprises a blended extrudate comprising a moisture content of below approximately 9% by weight after extrusion with a preferred moisture content between 5.5% and 9% in the extrudate; a fat content of below 6% by weight after extrusion with a preferred fat content between 2% and 6% in the extrudate; a protein content of approximately 10-12% after extrusion with a preferred protein content between 10.5% and 12.5% in the extrudate; and a caloric content of less than approximately 105 calories per ounce with a preferred range of between 100 and 115 calories per ounce of extrudate.

The preferred composition of the invention further comprises less than approximately 1 mg of cholesterol for each 100 g of blended extrudate, and the blended extrudate expands at a ratio of at least approximately 4:1 with a preferred range of expansion ratio between 3.5:1 and 5:1.

An object of the invention is the provision of a unique process of making an expanded nutritious snack product utilizing both meat and starch sources.

Another object of the invention is the provision of the snack food product having excellent organoleptic properties.

Yet another object of the invention is the provision of a snack food product having increased shelf and storage life.

Still another object of the invention is the provision of a process of making a snack food wherein gelatinization, protein denaturation, and physical restructuring of the blended ingredients is promoted.

An advantage of the invention is the provision of moisture by the use of raw frozen or chilled meat products in the process of making the snack food product.

Another advantage of the invention is the use of pregelatinized potato flour, thereby enhancing steam formation and expansion of the extrudate.

Yet another advantage of the invention is the elimination of drying, rendering, or cooking of the meat products used in making the extrudate.

Other objects, advantages, and novel features, and further scope of applicability of the present invention will be set forth in part in the detailed description to follow, and in part will become apparent to those skilled in the art upon examination of the following, or may be learned by practice of the invention. The objects and advantages of the invention may be realized and attained by means of the instrumentalities and combinations particularly pointed out in the appended claims.

DESCRIPTION OF THE PREFERRED EMBODIMENTS

In the following descriptions, examples are given to illustrate the principles upon which the invention is based; however, it should be understood that the use of this invention is not limited to the examples presented.

Extrusion in the examples that follow may be performed with a conventional screw-type extruder that has a variable-pitch compression screw (5:1) turning at 135-150 revolutions per minute to force the flow of a blend of raw, frozen, finely ground meat (proteinaceous) and pregelatinized potato flour (farinaceous) through a barrel in an atmosphere of pressure, heat, and mechanical shear. Driven rotation of the screw forces the blend through the barrel as the feed section receives the blend from the feed hopper and mixes the ingredients into a dense material in the compression section. The increased friction between the blend, the barrel surface, and the screw induce heat and shear as the flight depth of the screw gradually decreases. These conditions promote gelatinization, protein denaturation and restructuring of the tactile components of the blend.

The physical properties of the extrudate are highly dependent upon extrusion processing conditions, raw materials, and the interrelationship of these factors. The amount of compression, heat, and expansion can be regulated by the size of the die nozzle, screw compression ratio, and the screw revolutions per minute (rpm), as well as the amount of auxiliary heating supplied by the electric heating elements of the extruder. In addition, the amount of moisture in the raw materials fed into the feed section of the extruder affects the expansion of the extrudate. If the moisture is too high, there is little expansion; whereas if the moisture is too low, excessive browning of the extrudate may occur, as well as jamming of the extruder.

The optimum moisture content of the raw materials of the preferred embodiment of the invention passing into and through the extruder comprises between 12% and 20% by weight water. In contradistinction thereto, the prior art suggests that 20-40% by weight moisture content is desirable; below 20% by weight water, excessive heating and jamming of the extruder may occur.

The preferred process of the invention, however, provides moisture by utilizing raw, frozen, finely comminuted meat products. Since no prior cooking, drying, or rendering of the meat products is required, and since such heating processes significantly reduce the ability of meat proteins to bind and hold moisture during extrusion, less moisture overall is required in the extrusion process of the present invention.

Further, since pregelatinized potato flour is also an ingredient of the extrudate blend, moisture is more easily absorbed and retained during the extrusion process.

Perhaps most importantly, since the meat is frozen, the latent heat of vaporization thereof delays actual release of moisture while heating during the extrusion process. Less overall moisture is thereby required during the extrusion process; the provision of frozen meat products and concomitant delay in moisture release due to latent heat of vaporization is believed to require far less moisture.

The process comprises combining unrendered, raw, undried, frozen, finely comminuted lean meat products with a pregelatinized potato flour, enhances the ability of the raw materials (particularly the meat ingredients) to pass through the extruder at a temperature of between 100° C. and 130° C.) and at a moisture level between 12% and 20% by weight and still possess sufficient steam formation to bring about the desired expansion of the extrudate as it exits the die orifice without burning the extrudate. The use of the pregelatinized potato flour also ensures that the extrudate which exits the die orifice is entirely expanded without the need of subsequent frying or drying. Extrudate may then be cut to the desired lengths by altering the speed of the cutting device. Flavors, oil, spices, vitamins, and the like, may be topically applied before packaging and storing.

As an alternative to freezing, the fresh proteinaceous material may merely be chilled to some temperature at or below the freezing point of such proteinaceous material. Correspondingly, much less heat and pressure would thereby be required during the extrusion process to produce the desired expansion of the extrudate.

EXAMPLE 1

Mechanically separated fresh beef that had passed through a plate with 0.46 mm holes of a Beehive ® deboner was frozen or chilled. While still frozen or chilled, the mechanically separated beef was ground through a 0.38 cm plate using a meat grinder and stored at 0°-5° C. until immediately before blend preparation. Just before blend preparation, the frozen or chilled meat product was finely comminuted to obtain small particle size. Subsequently, the finely comminuted raw frozen or chilled meat was mixed with pregelatinized potato flour, with and without salt, to yield the following mixture with the following composition by weight percentages:

| | |
|---|---|
| Raw, machanically separated beef, finely chopped, frozen | 13.0% |
| Pregelatinized potato flour | 86.0% |
| Salt | 1.0% |

After the mixture was blended, it was immediately fed into a 1.9 cm barrel size single screw extruder (C. W. Brabender, Model 2003) where the mixture was heated and compressed to result in gelatinization. The feed section was maintained at 25° C. by air cooling, while the compression and metering sections were set and maintained at 130° C. The product exited the die nozzle at approximately 110° C. The screw of the extruder was rotated at 130 rpm and had a 5:1 compression ratio to provide maximum shear pressure to result in adequate expansion of the extrudate. The extrudate was cut into portions that were one inch in length and had an expansion ratio (cross-sectional area of extrudate ÷ cross-sectional area of the die orifice) of 3.97 to 4.41 and a density (g/ml) of 0.09. The resulting product requires no further puffing or drying before being flavored, resulting in a snack food alone or with the desired flavor applied topically.

EXAMPLE 2

The procedure of Example 1 was repeated, except that in lieu of mechanically separated beef, a mixture of fresh lean beef shank (10.4%) meat and 2.6% by weight of fat was used. Prior to comminution, the raw product was frozen or chilled and prepared, similarly as in Example 1, and processed through the single screw extruder.

| | |
|---|---|
| Raw lean beef shank meat, finely chopped and frozen | 10.4% |
| Beef fat, finely chopped and frozen | 2.6% |
| Pregelatinized potato flour | 86.0% |
| Salt | 1.0% |

The resulting extrudate was similar in color, expansion, density, and flavor to the product in Example 1.

EXAMPLE 3

The procedure of Example 1 was repeated, serially, except that in lieu of mechanically separated beef, a mixture of fresh, fat-reduced beef trimmings (88% lean, 12% fat) was used. The mixture contained the following composition by weight percentages:

| | |
|---|---|
| Raw fat-reduced beef trimmings, finely chopped, frozen or chilled | 13.0% |
| Pregelatinized potato flour | 86.0% |
| Salt | 1.0% |

The product which resulted was similar to the product of Examples 1 and 2, but lacked the same degree of expansion.

The resulting snack food exhibited significant protein quality. A bioassay study with rats revealed that extrudates contining blended salt caused diarrhea; accordingly, in subsequent tests, salt was applied topically after extrusion and cutting, rather than incorporating it in the blend prior to extrusion.

As shown by Table I, all of the essential amino acids are present in the extrudate. The percentage of the essential amino acids present in the snack food was 72% of the human requirement.

TABLE I

| Amino Acid | NMSU Snack Food (1990) | Human Requirement |
|---|---|---|
| Isoleucine | 2.7 | 4.0 |
| Leucine | 4.7 | 7.0 |
| Lysine | 4.0 | 5.5 |
| Methionine | 1.5 | 3.5 |
| Phenylalanine | 3.2 | 6.0 |
| Threonine | 3.2 | 4.0 |
| Tryptophane | 0.7 | 1.0 |
| Valine | 4.2 | 5.0 |
| Histidine | 2.4 | 1.4 |
| Total | 27.6% | 38.4% |

Additionally, the extruded snack food possesses significant food value. Nutritional content of the snack food is as follows in Table II:

TABLE II

| Item | Amount |
|---|---|
| Serving Size | 28.4 g (1 oz.) |
| Calories[c] | 103 |
| Protein[a,d] | 3.2 g |
| Fat[a,d] | 1.1 g |
| Carbohydrate[a] | 20 g |
| Cholesterol[b] | <1 mg/100 g |
| Sodium[a,c] | 128 mg |
| Iron[a,c] | 1 mg |
| Calcium[a,c] | 76 mg |

[a]New Mexico Department of Agriculture, Las Cruces, New Mexico
[b]National Environmental Testing, Inc., Chicago, Illinois
[c]Nutrition Laboratory, Department of Animal and Range Sciences, New Mexico State University, Las Cruces, New Mexico
[d]Ruben/Prepared Foods, Inc., U.S.D.A. approved laboratory, Santa Teresa, New Mexico Further, the fatty acid distribution of the snack food extrudate is as follows:

TABLE III

| Type of Fatty Acids | % of Total Fat |
|---|---|
| Saturated[a] | 35.2 |
| Monounsaturated[a] | 62.1 |
| Polyunsaturated[a] | 2.7 |

[a]National Environmental Testing, Inc., Chicago, Illinois

Other significant tabular test data that are largely self-explanatory are the following:

TABLE IV

Caloric Distribution of the Snack Food[a]
(Nutrition Laboratory, Department of Animal and Range Sciences, New Mexico State University Las Cruces, New Mexico)

| Item | Calories |
|---|---|
| Protein | 13 |
| Fat | 10 |
| Carbohydrate | 80 |

[a]Each gram of carbohydrate and protein = 4 calories, while each gram of fat = 9 calories.

TABLE V

Microbiological Count of the Snack Food
New Mexico State University
Ruben/Prepared Foods, Inc., U.S.D.A., Approved Laboratory
Santa Teresa, New Mexico

| Microorganism | Count | | |
|---|---|---|---|
| | Day 1 | Day 30 | Day 60 |
| Standard plate count | <100/g | <100/g | <100/g |
| Coliform | <10/g | <10/g | <10/g |
| Staphylococcus aureus | <10/g | <10/g | <10/g |
| Salmonellae | Negative | Negative | Negative |

TABLE VI

Influence of Storage for 30 and 60 Days Upon the Shear Strength of an Expanded Snack Food
(New Mexico State University - 1990)

| Product | Storage Period | | | |
|---|---|---|---|---|
| | Day 1 (n = 240) | Day 30 (n = 240) | Day 60 (n = 240) | Mean |
| Snack with Salt | 10.27 | 15.08 | 17.01 | 14.10 |
| Snack without Salt | 9.33 | 12.35 | 12.93 | 11.54 |
| Mean | 9.77 | 13.72 | 14.97 | |

TABLE VII

Thiobarbituric Acid (TBA) as a Measure of Oxidative Rancidity in the Snack Food
(Pope Testing Laboratory, Dallas, TX)

| Sample No. | Type of Snack | Mg Malonaldehyde/1000 g of product | | |
|---|---|---|---|---|
| | | 7/27/90 | 8/27/90 | 9/27/90 |
| 1 | Unflavored | 0.8 | 0.6 | 0.4 |
| 2 | Unflavored | 0.8 | 0.5 | 0.2 |
| 3 | Unflavored | 0.8 | 0.6 | 0.3 |
| 4 | Unflavored | 0.9 | 0.7 | 0.3 |
| 5 | Flavored | 0.6 | 0.3 | 0.6 |
| 6 | Flavored | 0.8 | 0.4 | 0.4 |
| 7 | Flavored | 0.7 | 0.3 | 0.3 |
| 8 | Flavored | 0.7 | 0.4 | 0.3 |

TABLE VIII

Proximate Analyses of Raw Materials
Used in Producing the Snack Food
(New Mexico State University)

| Item, % | Mechanically Separated Beef #1 | Mechanically Separated Beef #2 | Boneless Shank Beef | Potato Flour #1 | Potato Flour #2 |
|---|---|---|---|---|---|
| Protein | 17.5 | 15.5 | 18.1 | 10.5 | 9.5 |
| Fat | 27.3 | 20.0 | 8.2 | 1.2 | 1.4 |
| Fiber | 0.42 | 0.10 | 0.86 | 1.8 | 2.4 |
| Moisture | 52.9 | 61.2 | 53.1 | 6.0 | 5.6 |
| Ash | 2.4 | 3.5 | 3.0 | 4.0 | 3.7 |
| Iron | 0.010 | 0.02 | 0.014 | 0.00265 | 0.0027 |
| Calcium | 1.67 | 3.5 | 0.01 | 0.035 | 0.038 |
| Sodium | 0.33 | 0.44 | 0.38 | 0.06 | 0.048 |

Thus, the invention provides a relatively nutritious, tasty snack food that has, inter alia, good expansion characteristics (approximately 4:1), relatively low caloric content, good storage capability, and low microbiological organism count.

The preceding examples can be repeated with similar success by substituting the generically or specifically described reactants and/or operating conditions of this invention for those used in the preceding examples.

Although the invention has been described with reference to these preferred embodiments, other embodiments can achieve the same results. Variations and modifications of the present invention will be obvious to those skilled in the art and it is intended to cover in the appended claims all such modifications and equivalents. The entire disclosures of all applications, patents, and publications cited above, and of the corresponding application are hereby incorporated by reference.

What is claimed is:

1. A method of preparing a snack food consisting essentially of the steps of:
   (a) freezing fresh proteinaceous material;
   (b) storing the frozen proteinaceous material at a temperature within the range of 0°-5° C.;
   (c) comminuting the stored frozen proteinaceous material;
   (d) blending the comminuted frozen proteinaceous material with pregelatinized farinaceous material to obtain a blend having a moisture content of less than 20% by weight;
   (e) extruding the blended proteinaceous material and farinaceous material while heating the blended proteinaceous and farinaceous material above its heat of vaporization thereby causing an expansive release of water vapor; and
   (f) expanding the blended proteinaceous and farinaceous material.

2. The method of claim 1 wherein the step of freezing proteinaceous material comprises the steps of mechanically preparing and freezing selected meat products.

3. The method of claim 2 wherein the step of mechanically preparing selected meat products comprises the step of deboning selected beef products.

4. The method of claim 2 wherein the step of mechanically preparing selected meat products comprises the step of mixing lean meat and fat.

5. The method of claim 2 wherein the step of mechanically preparing selected meat products comprises the step of providing fat-reduced beef trimmings.

6. The method of claim 1 wherein the step of extruding the blended proteinaceous and farinaceous material further comprises the step of compressing the blended proteinaceous and farinaceous material.

7. The method of claim 1 wherein the steps of heating and subsequently expanding further comprise the step of heating the blended proteinaceous and farinaceous material in the range of 100°–130° C.

8. The method of claim 1 wherein the step of extruding the blended proteinaceous and farinaceous material further comprises the step of cutting the blended proteinaceous and farinaceous material after emerging from the extruder.

9. The method of claim 8 wherein the step of cutting the blended proteinaceous and farinaceous material further comprises the step of seasoning the blended proteinaceous and farinaceous material.

10. The method of claim 1 wherein the step of extruding the blended proteinaceous and farinaceous material further comprises the step of seasoning the blended proteinaceous and farinaceous material.

11. A method of preparing a snack food consisting essentially of the steps of:
 (a) chilling fresh proteinaceous material;
 (b) storing the chilled proteinaceous material at a temperature within the range of 0°–5° C.;
 (c) comminuting the stored chilled proteinaceous material;
 (d) blending the comminuted chilled proteinaceous material with pregelatinized farinaceous material to obtain a blend having a moisture content of less than 20% by weight;
 (e) extruding the blended proteinaceous material and farinaceous material while heating the blended proteinaceous and farinaceous material above its heat of vaporization thereby causing an expansive release of water vapor; and
 (f) expanding the blended proteinaceous and farinaceous material.

12. The method of claim 11 wherein the step of chilling proteinaceous material comprises the steps of mechanically preparing and chilling selected meat products.

13. The method of claim 12 wherein the step of mechanically preparing selected meat products comprises the step of deboning selected beef products.

14. The method of claim 12 wherein the step of mechanically preparing selected meat products comprises the step of mixing lean meat and fat.

15. The method of claim 12 wherein the step of mechanically preparing selected meat products comprises the step of providing fat-reduced beef trimmings.

16. The method of claim 11 wherein the step of extruding the blended proteinaceous and farinaceous material further comprises the step of compressing the blended proteinaceous and farinaceous material.

17. The method of claim 11 wherein the steps of heating and subsequently expanding further comprise the step of heating the blended proteinaceous and farinaceous material in the range of 100°–130° C.

18. The method of claim 11 wherein the step of extruding the blended proteinaceous and farinaceous material further comprises the step of cutting the blended proteinaceous and farinaceous material after emerging from the extruder.

19. The method of claim 18 wherein the step of cutting the blended proteinaceous and farinaceous material further comprises the step of seasoning the blended proteinaceous and farinaceous material.

20. The method of claim 11 wherein the step of extruding the blended proteinaceous and farinaceous material further comprises the step of seasoning the blended proteinaceous and farinaceous material.

\* \* \* \* \*